United States Patent [19]

Askins

[11] Patent Number: 4,638,589
[45] Date of Patent: Jan. 27, 1987

[54] ANIMAL TRAP WITH IMPROVED SECURITY

[75] Inventor: William E. Askins, Lititz, Pa.

[73] Assignee: Woodstream Corporation, Lititz, Pa.

[21] Appl. No.: 757,803

[22] Filed: Jul. 22, 1985

[51] Int. Cl.⁴ ............................................. A01M 23/26
[52] U.S. Cl. .......................................... 43/88; 43/92; 43/96
[58] Field of Search .................. 43/88, 89, 90, 91, 92, 43/93, 94, 95, 96

[56] References Cited

U.S. PATENT DOCUMENTS

| | | | |
|---|---|---|---|
| 1,960,122 | 5/1934 | Pitre | 43/88 |
| 2,216,911 | 10/1940 | Hannold | 43/88 |
| 3,335,517 | 8/1967 | Montgomery | 43/92 |
| 3,535,816 | 10/1970 | Montgomery | 43/93 |
| 4,486,972 | 12/1984 | Helfrich | 43/88 |

Primary Examiner—Kuang Y. Lin
Assistant Examiner—Kurt Rowan
Attorney, Agent, or Firm—Holman & Stern

[57] ABSTRACT

An animal trap of a type having pivotal jaws operated by spring loaded actuators which embrace the jaws and which are pivotally mounted on the arms of a U-shaped retention pin is provided with a security device for preventing an animal caught in the trap from pulling out the pin with its teeth and thereby dismantling the trap. The security device is in the form of a tongue upset from a cross frame member of the trap over which the base portion of the pin extends. The tongue engages the outer surface of the pin and prevents axial withdrawal of the pin arms from the actuators.

2 Claims, 2 Drawing Figures

U.S. Patent   Jan. 27, 1987   4,638,589
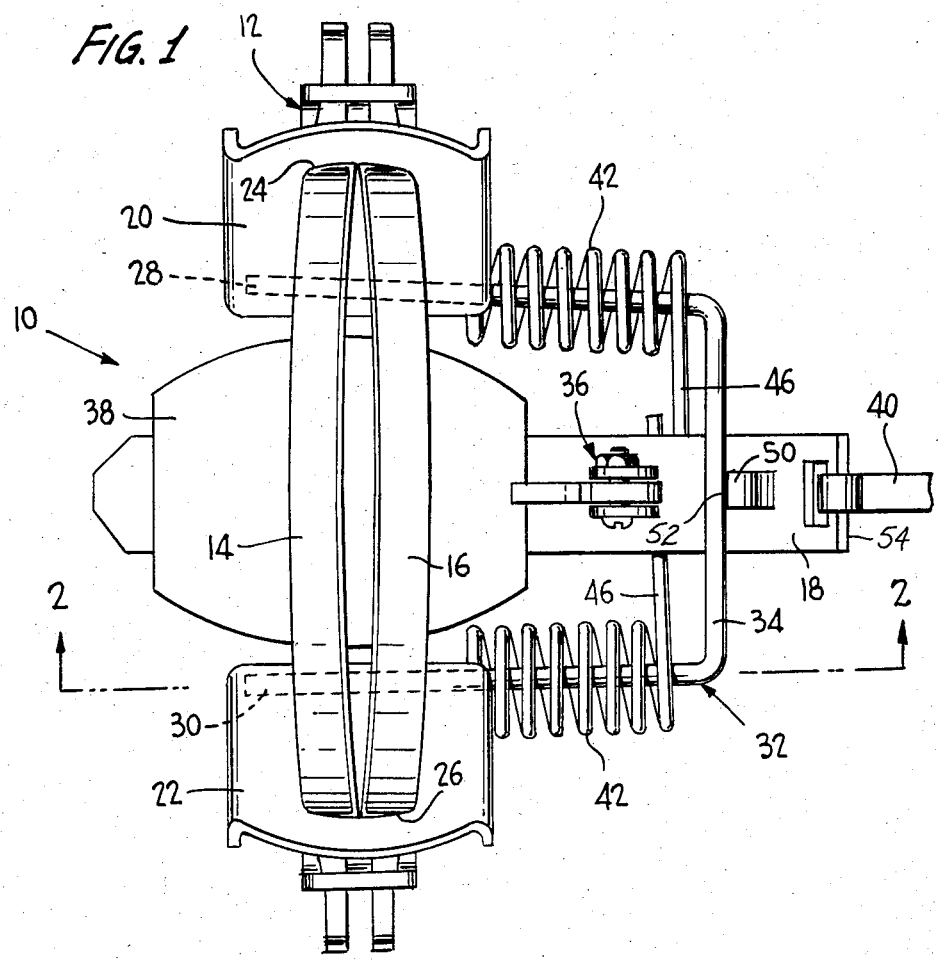
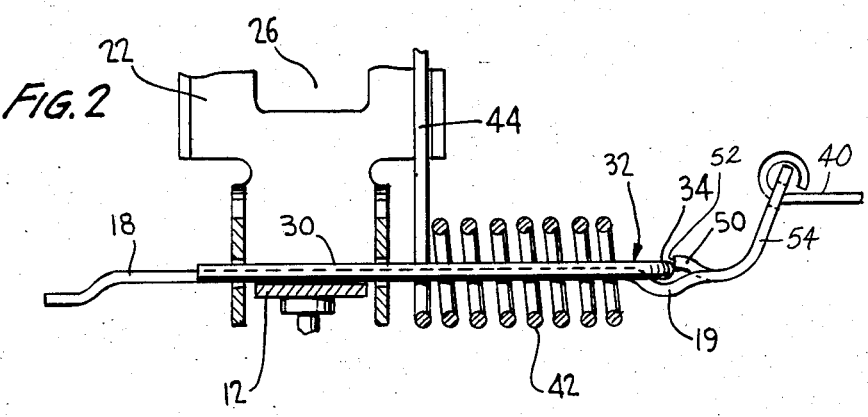

ANIMAL TRAP WITH IMPROVED SECURITY

BACKGROUND OF THE INVENTION

This invention relates to animal traps of the type in which a pair of pivotal jaws are controlled by respective spring loaded actuators which each embrace the jaws and which are spread apart against the spring pressure to allow the jaws to be opened and set by means of a trigger mechanism. The trigger mechanism commonly includes a bait pan and a trigger dog which engages the bait pan over one of the jaws, so that when the trap is set, depression of the bait pan by an animal disengages the dog, releasing the jaws, thereby springing the trap and snapping the jaws closed through spring pressure acting on the jaws via the actuators.

Traps of the above type are well known and in common usage as leghold traps for coyotes, raccoons, and other animals. Examples of such traps are shown in prior U.S. Pat. Nos. 2,489,095; 2,632,974, 4,240,223; 4,272,907; and 4,479,324, the disclosures of which are expressly incorporated herein by reference.

In the subject traps, the jaws are generally pivotally mounted at opposite ends of one member of a cross-like frame and the actuators are pivotally mounted on respective arms of a U-shaped retention pin. The arms of the pin also carry coil springs each having one extended end engaging a respective actuator and another extended end engaging under the other member of the cross-like frame, so as to bias the actuators to closed position. The base portion of the U-shaped pin which connects the arms generally extends across the other member of the cross-like frame between attachments for the bait pan and the trigger dog.

It has been found that when traps as described are sprung on an animal, it may be possible for the animal to pull out the U-shaped retention pin with its teeth from the base portion of the pin, thereby dismantling the trap and freeing the animal. This tends to occur most frequently in coyote traps but can also happen in smaller raccoon traps.

The present invention provides a means for enhancing pin retention in the subject traps, thereby improving the security of the traps in preventing the escape of trapped animals.

SUMMARY OF THE INVENTION

In accordance with the invention, the cross member of the frame of an animal trap of the kind described across which the base portion of the U-shaped retention pin extends, is provided with a stop which engages against the outer surface of the base portion of the aforesaid U-shaped pin. It is found that this rather simple expedient is remarkably effective in preventing an animal from pulling out the pin and thereby releasing itself from the trap. The stop may, for example, be in the form of a lance or tongue which is upset from the body of the cross member.

A stop, particularly when in the form of an upset, is insignificant so far as additional trap manufacturing costs are concerned and yet provides a surprisingly effective means for preventing escape of an animal from the trap.

Additional features and advantages of the invention will be apparent from the ensuing description and claims read in conjunction with the attached drawings.

BRIEF DESCRIPTION OF DRAWINGS

FIG. 1 is a plan view of an animal trap in accordance with the invention, and

FIG. 2 is a sectional view on line 2-2 of FIG. 1.

DESCRIPTION OF PREFERRED EMBODIMENT

An animal trap 10 is of the general type disclosed in U.S. Pat. No. 4,479,324, the disclosure of which is incorporated herein by reference. Accordingly, the construction and operation of the trap will not be described herein in detail except insofar as it pertains to the particular features of the invention.

In general terms therefore, trap 10 includes a cross-like frame having a first member 12 with upturned ends in which are pivotally mounted a pair of opening and closing arch-shaped trap jaws 14, 16, the frame further including a cross member 18. A pair of jaw actuators 20, 22 have central apertures 24, 26 each embracing both jaws at opposite ends thereof, the actuators being pivotally carried on the respective arms 28, 30 of an elongate U-shaped retention pin 32. A base portion 34 of the pin connecting the respective arms extends across the cross member 18 between an attachment 36 for a pivoted bait pan 38, and an upturned dog mounting end 56 of the cross member forming an attachment for a swinging trigger dog 40. The arms of pin 32 also each carry a respective coil spring 42. One end portion 44 of each spring is extended and engages under one of the jaw actuators and the other end portion 46 of each pin is extended and engages under the cross member 18. The coil springs urge the respective actuators upwardly toward the sprung or closed position of the trap shown in the drawings.

To set the trap, the actuators are pushed down against the spring action allowing the jaws to be opened. When open, jaw 16 lies across the cross member 18 between the base portion 34 of pin 32 and the end of the cross member, so that dog 40 can be swung over the jaw to engage a detent (not shown) on the trigger pan and provide a releasable latch or barrier preventing the jaws from being closed. When, however, an animal pushes down on the bait pan, the trigger dog is released allowing the jaws to snap closed on the animal's leg under the action of the coil springs.

As previously noted, in prior art traps of this type it has been found that a trapped animal may be able to pull out pin 32 with its teeth, thereby dismantling the trap and allowing the animal to escape, even though the base portion of the pin may sit in a depression 19 formed in cross member 18. Accordingly, the invention provides means for preventing withdrawal of pin 32, such means being in the form of a stop 50 which engages against the outside of base portion 34 of the pin to prevent its withdrawal. In the illustrated embodiment, stop 50 is in the form of a lance or tongue which is upset from the body of cross member 18 and protrudes to a height somewhat above the level of the pin. It will be apparent from the drawings that the lance has a free end 52 positioned for engagement by base portion 34 of the pin to prevent pin withdrawal. Other forms of stop structure, however, may also be used.

The stop, while being a simple addition to the trap is found to be remarkably effective in preventing withdrawal of the retention pin, and hence a valuable asset in preventing escape of trapped animals.

While only a preferred embodiment of the invention is described herein in detail, the invention is not limited thereby and modifications can be made within the scope of the attached claims.

I claim:

1. In an animal trap of the type including a pair of pivotal jaws, and spring loaded actuators for moving the jaws from open to closed position, the actuators each embracing the respective arms of a U-shaped retention pin, the arms of the retention pin further carrying springs for the respective actuators, and the retention pin having a base portion connecting the arms of the pins which base portion extends across a frame member of the trap between a bait pan attachment and a dog mounting end of the frame member, the improvement comprising means for preventing an animal caught in the trap from withdrawing the arms of the pin from the actuators and thereby dismantling the trap, said means comprising a lance upset from the frame member between the base portion of the pin and the dog mounting end of the frame member, the lance having a free end positioned for engagement by an outer surface of the base portion of the pin precluding axial movement of the pin arms in a direction withdrawing same from the actuators.

2. The invention of claim 1 wherein the base portion of the pin sits in a depression in the frame member, the lance being located behind the depression and protruding to a level above the base portion of the pin.

* * * * *